United States Patent
Gudlavenkatasiva et al.

(10) Patent No.: US 9,560,506 B2
(45) Date of Patent: Jan. 31, 2017

(54) EMERGENCY CONTACTS INFORMATION SYSTEM

(71) Applicant: Verizon Patent and Licensing Inc., Arlington, VA (US)

(72) Inventors: Bhaskar R. Gudlavenkatasiva, Temple Terrace, FL (US); James M. Wiley, Bluefield, WV (US); Sutap Chatterjee, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 207 days.

(21) Appl. No.: 13/891,542

(22) Filed: May 10, 2013

(65) Prior Publication Data
US 2014/0335814 A1 Nov. 13, 2014

(51) Int. Cl.
*H04W 4/22* (2009.01)
*H04W 76/00* (2009.01)
*H04W 4/02* (2009.01)

(52) U.S. Cl.
CPC ............ *H04W 4/22* (2013.01); *H04W 76/007* (2013.01); *H04W 4/023* (2013.01)

(58) Field of Classification Search
CPC ........ H04W 4/02; H04W 4/022; H04W 4/023; H04W 76/007; H04M 2242/04; H04M 1/274583
USPC ............................................ 455/404.1–404.2
See application file for complete search history.

(56) References Cited

U.S. PATENT DOCUMENTS

| | | | | |
|---|---|---|---|---|
| 7,212,111 | B2 * | 5/2007 | Tupler et al. | 340/539.18 |
| 2007/0243853 | A1 * | 10/2007 | Bumiller | G06F 19/323 |
| | | | | 455/404.1 |
| 2009/0233629 | A1 * | 9/2009 | Jayanthi | 455/457 |
| 2011/0003576 | A1 * | 1/2011 | Sun et al. | 455/404.1 |
| 2012/0124059 | A1 * | 5/2012 | Pratt | G06Q 10/107 |
| | | | | 707/748 |
| 2013/0143669 | A1 * | 6/2013 | Muller | 463/42 |
| 2013/0315383 | A1 * | 11/2013 | Lieu | H04W 4/22 |
| | | | | 379/39 |

* cited by examiner

*Primary Examiner* — Erica Navar

(57) ABSTRACT

A system may be configured to receive a request for emergency contact information associated with a first user. The request may include information identifying the first user. The system may further determine a geographic location of the first user; and identify a second user. The identifying may be based on at least one of an amount or frequency of communication between the first user and the second user, or a geographical proximity of the first user to the second user. The system may additionally identify contact information associated with the second user; and output, to a device from which the request was received, the contact information associated with the second user.

20 Claims, 13 Drawing Sheets

800

Enter all available information for best results

Telephone #

Name

Address

Zip code

Look up emergency contacts

Emergency contact details for 555-555-1234

Name: John Smith

Contact #1:
Aaron Smith (Brother)
Tel. #: 123-321-1234

Contact #2:
Brian Jones (Roommate)
Tel. #: 321-321-4321

Contact #3:
Christopher Andrews (Friend*)
Tel. #: 124-421-1233

*Emergency contact automatically identified based on proximity to present location

FIG. 10

EMERGENCY CONTACTS INFORMATION SYSTEM

BACKGROUND

User devices, such as cellular telephones, may store information regarding emergency contacts (also referred to as in case of emergency, or "ICE" information). For instance, a user may manually provide an entry into a contacts directory of the user device. Users may commonly designate a name of the entry as "ICE," and a number associated with the "ICE" entry may be a telephone number associated with the emergency contact. This emergency information may be used when the user is in an emergency situation. For example, emergency personnel, such as paramedics, may use ICE information to call family members of a car crash victim, who has been rendered unconscious and/or unintelligible.

BRIEF DESCRIPTION OF THE DRAWINGS

FIGS. 8-10 illustrate examples of looking up emergency contact information;

DETAILED DESCRIPTION OF PREFERRED EMBODIMENTS

The following detailed description refers to the accompanying drawings. The same reference numbers in different drawings may identify the same or similar elements.

As mentioned above, users may manually store "ICE" contact information in contact directories of their user devices. However, some users do not store this information in their user devices, and/or some emergency personnel may not be familiar with the operation of some user devices. Furthermore, in some situations, emergency contact information may change (e.g., a user designated as an emergency contact has changed his or her telephone number). In these situations, emergency personnel may have difficulty notifying family members, and/or other contacts, that the user has met with an emergency situation.

Figure 1:
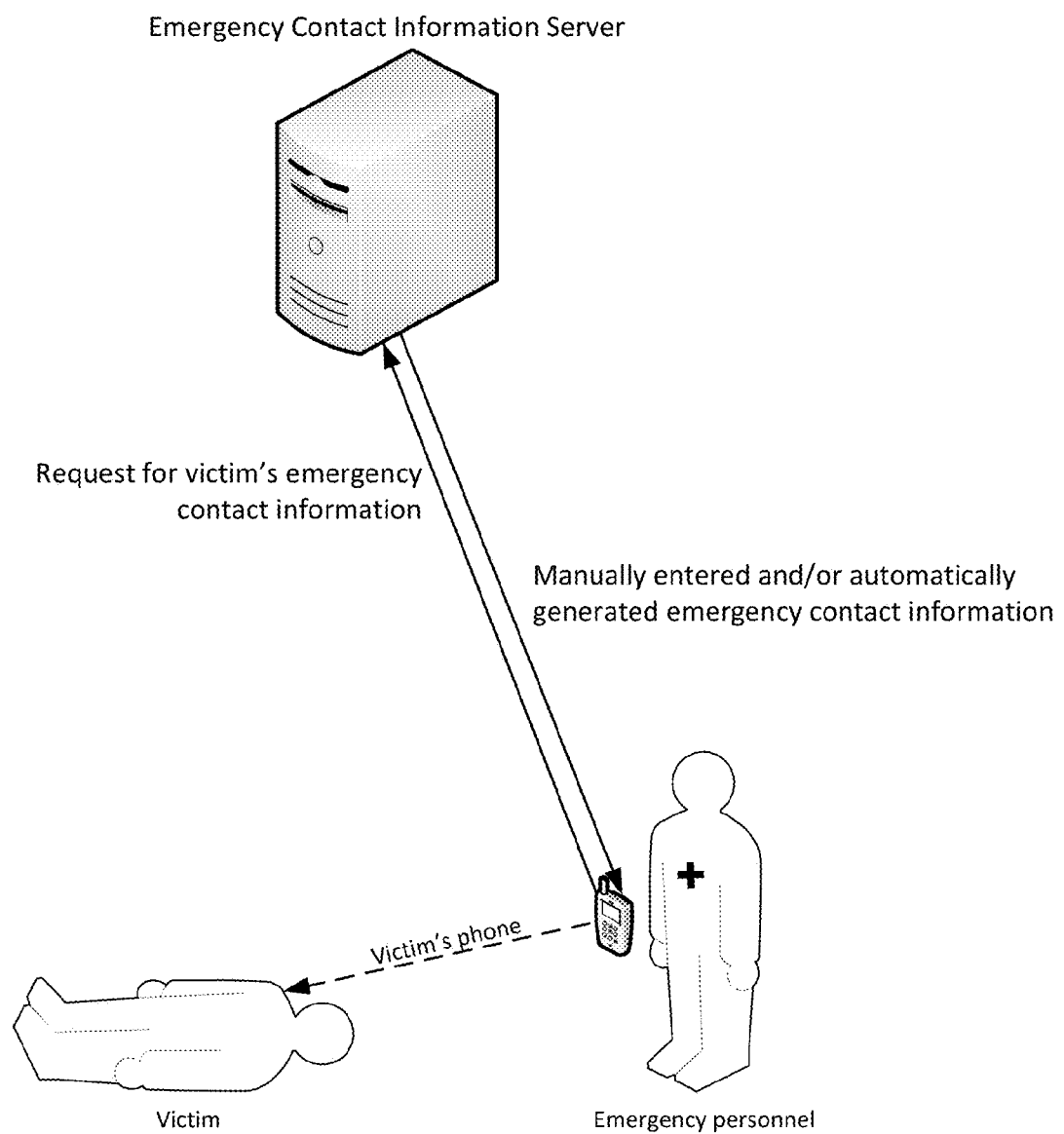
FIG. 1 illustrates an overview of one or more example implementations described herein.

One or more implementations described herein may provide for a convenient, centralized lookup of emergency contact information for a user. For example, as shown in FIG. 1, a victim (e.g., a victim of a car accident) may be carrying a cellular telephone. Emergency personnel (e.g., a medical provider) may use information associated with the telephone to look up emergency contact information associated with the victim. For example, as described below, the medical personnel may use the victim's telephone to contact an emergency contact information server, in order to retrieve emergency contact information.

Additionally, or alternatively, the medical personnel may use another device (e.g., a cellular phone owned by, or otherwise associated with, the medical personnel) to look up the victim's emergency contact information. For instance, in some implementations, the medical personnel may look up the emergency contact information based on the user's name, telephone number, address, and/or other information (e.g., information found on the victim's driver's license and/or from another source). As shown, the emergency contact information server may provide information regarding emergency contacts to the medical personnel. This information may include manually entered information— that is, emergency contact information that was previously provided by the victim.

Additionally, or alternatively, the emergency contact information may include automatically generated emergency contact information. For instance, based on factors such as the victim's calling patterns, present location, and/or other factors, the emergency contact information server may dynamically identify emergency contacts, and may provide information regarding these dynamically generated emergency contacts in addition to, or in lieu of, information regarding the manually entered emergency contacts. Providing information regarding dynamically generated emergency contacts may be useful in certain situations.

Figure 2:
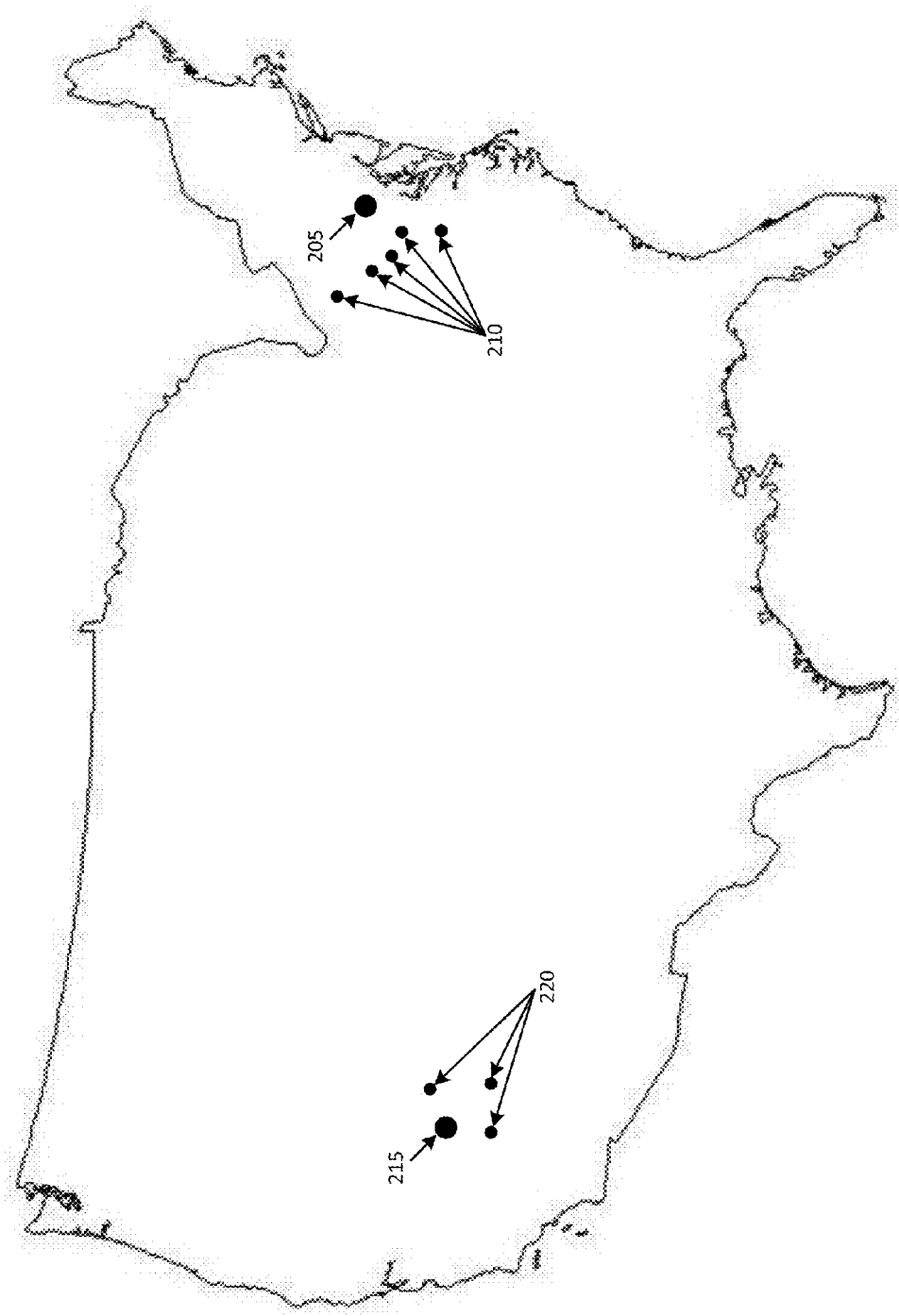
FIG. 2 illustrates an example situation where it may be advantageous to automatically generate contact information.

For example, referring to FIG. 2, assume that the victim lives at geographic location 205. Further assume that emergency contacts, manually provided by the victim, live at geographic locations 210—that is, relatively near the victim's home. The victim may, in some circumstances (e.g., vacation, a business trip, etc.), visit a location that is relatively distant from the victim's home, and may have been a victim of a car accident while being away from home. For example, as shown in FIG. 2, assume that the victim has been involved in a car accident at geographic location 215. In this situation, the emergency contact information that was manually provided by the victim may not be entirely useful, as the victim is across the country from theses emergency contacts. In some implementations, the emergency contact information server may automatically identify dynamically generated emergency contacts, such as emergency contacts that are closer to the victim's present location (e.g., emergency contacts that are at locations 220). By identifying these dynamically generated emergency contacts, the emergency contact information server may provide more useful emergency contact information, as emergency contacts that are closer to a victim may be better suited to provide aid and/or support to the victim.

Figure 3:
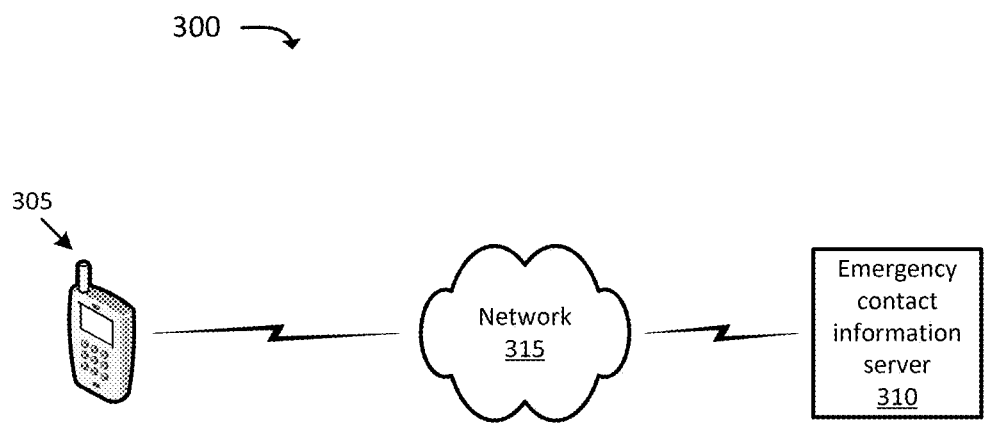
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, emergency contact information server 310, and network 315. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

User device 305 may include any computation and communication device, such as a wireless mobile communication device that is capable of communicating with network 315. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send and/or receive traffic to and/or from emergency contact information server 310 via network 315, and/or one or more other devices.

Emergency contact information server 310 may include one or more devices that perform one or more functions related to providing emergency contact lookup information related to user device 305 and/or another device or user. Further detail of example functionality of emergency contact information server 310, according to some implementations, is described below with respect to FIG. 4.

Network 315 may include one or more wired and/or wireless networks. For example, network 315 may include a packet data network ("PDN"), such as an IP-based PDN. Network 315 may include, for example, a wide area network such as the Internet, or one or more other networks. User device 305 and/or other devices may communicate with each other via network 315, and/or via one or more other networks.

In some implementations, network 315 may include an evolved packet system ("EPS") that includes a LTE network and/or an evolved packet core ("EPC") network that operate based on a third generation partnership project ("2GPP") wireless communication standard. The LTE network may be, or may include, a radio access network ("RAN") that includes one or more base stations, some or all of which may take the form of an evolved node B ("eNB"), via which user device 305 may communicate with the EPC network. The EPC network may include one or more serving gateways ("SGWs"), mobility management entities ("MMEs"), and/or packet data network gateways ("PGWs"), and may enable user device 305 to communicate with network 315 and/or an IP multimedia subsystem ("IMS") core network. The IMS core network may include home a subscriber server/authentication, authorization, and accounting server ("HSS/AAA server"), and may manage authentication, session initiation, account information, a user profile, etc. associated with user device 305.

Figure 4:
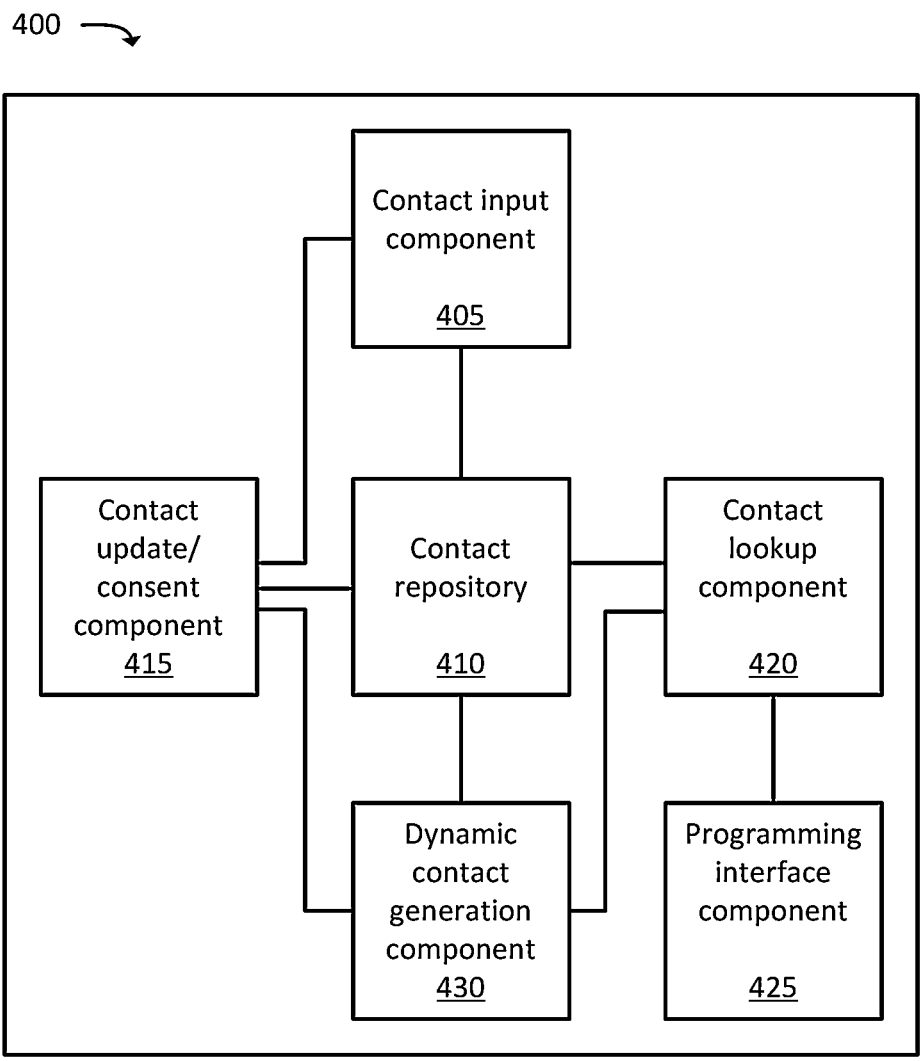
FIG. 4 illustrates example components of one or more of the devices shown in FIG. 2.

FIG. 4 illustrates example components of device 400, which may correspond to, for example, emergency contact information server 310 of FIG. 3 (and/or one or more other devices). As shown, example device 400 may include contact input component 405, contact repository 410, contact update/consent component 415, contact lookup component 420, programming interface component 425, and dynamic contact generation component 430. In some implementations, device 400 may include additional, fewer, different, and/or differently arranged components. In some implementations, the functions performed by one component of device 400 may be additionally, or alternatively, performed by one or more other components. In some implementations, one or more components of device 400 may perform additional or fewer functions than described herein.

Contact input component 405 may receive information regarding manually entered emergency contacts. For example, a user (e.g., a user of user device 305) may provide information regarding contacts, which the user desires to be contacted in case of emergency. The user may input the information via a user interface, such as via a web page or an application that is running on user device 305 and/or another device. The emergency contact information may include, for example, a name, a telephone number, an email address, a relationship to the user (e.g., relative, friend, co-worker, etc.), and/or other information. Contact input component 405 may output the information regarding the manually entered emergency contacts to contact repository 410.

Figure 5:
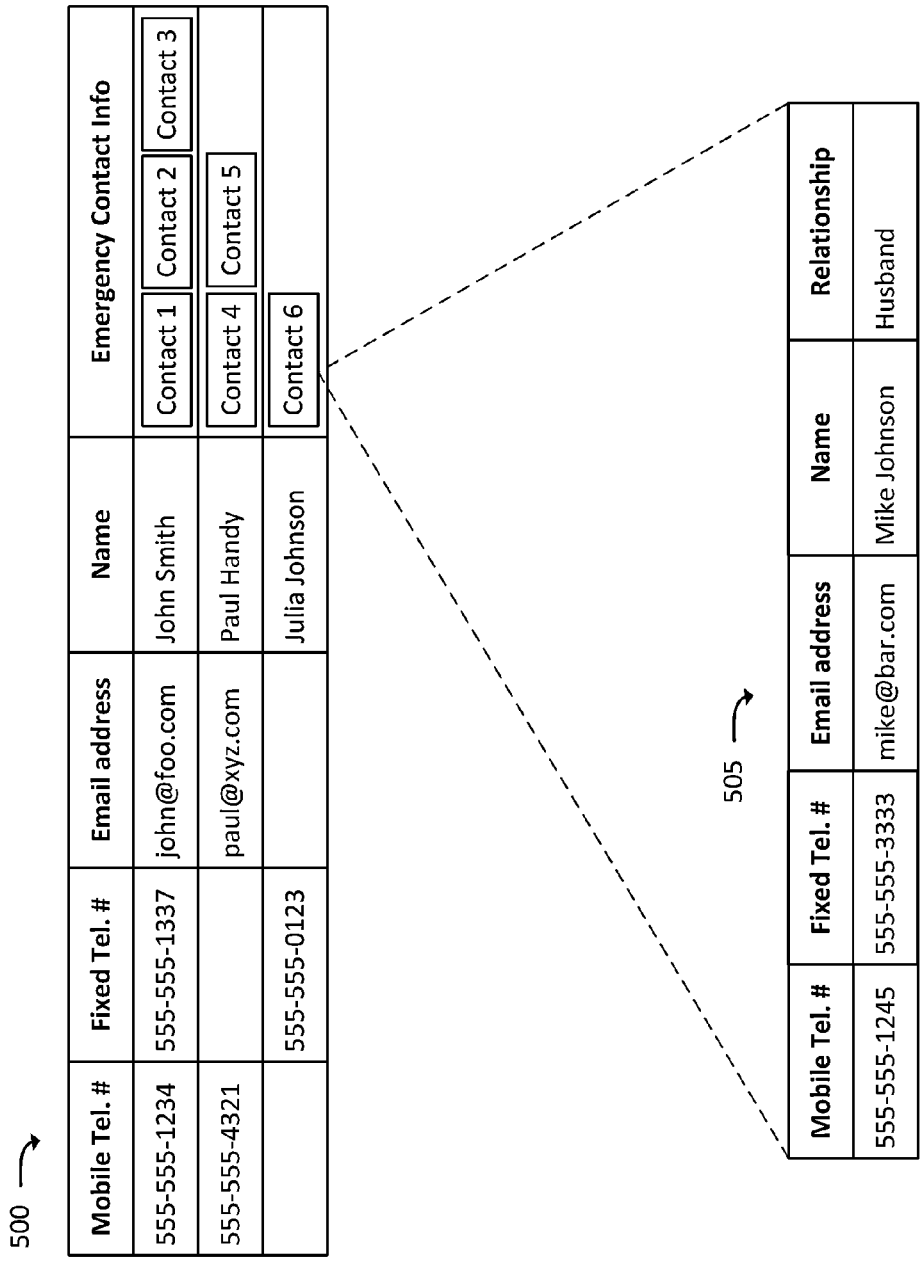
FIG. 5 illustrate example data structures that may be stored by an emergency contact information server and/or another device.

Contact repository 410 may store information regarding emergency contacts (e.g., as provided by contact input component 405 and/or by dynamic contact generation component 430, as described further below). FIG. 5 illustrates example data structures 500 and 505, which may be stored by contact repository 410. As shown, data structure 500 may include information that may be used to look up emergency contact information for users. Data structure 500 may include user information, such as mobile telephone numbers, fixed telephone numbers, email addresses, and names. For each user, data structure 500 may also include information regarding emergency contacts associated with the user.

As is apparent from the example shown in FIG. 5, some of the information in data structure 500 may be considered optional in some implementations. That is, a set of one or more fields in data structure 500 may be required (e.g., the user must provide either a mobile telephone number or a fixed telephone number), while other fields may not be required. As described below, if a user provides more information than is required, it may be more likely that emergency contact information can be looked up for the user.

As shown in FIG. 5, the information for a particular user may include information regarding one or more emergency contacts associated with the user. For example, the user John Smith may be associated with Contact 1, Contact 2, and Contact 3; Paul Handy may be associated with Contact 4 and Contact 5, and Julia Johnson may be associated with Contact 6.

Data structure 505 may be associated with a particular contact. Thus, data structure 500 may include several instances and/or references to of data structure 505. For instance, since five distinct contacts are shown in FIG. 5, data structure 500 may include five instances of data structure 505. Data structure 505 may include information regarding a mobile telephone number, a fixed telephone number, an email address, a name, and a relationship (e.g., relationship to the corresponding user).

Returning to FIG. 4, contact update/consent component 415 may obtain consent from emergency contacts (e.g., permission as to whether these emergency contacts would like to be listed as emergency contacts for a particular user), and/or may periodically update the information stored by contact repository 410. For instance, when information regarding an emergency contact is received or generated by contact input component 405 and/or dynamic contact generation component 430, contact update/consent component 415 may obtain consent from the emergency contact. For example, contact update/consent component 415 may use a telephone number and/or an email address to send a message (e.g., a short message service ("SMS") message, an email message, an automated voice call, etc.) to the emergency contact, requesting permission to associate the emergency contact with the user.

Figure 6:
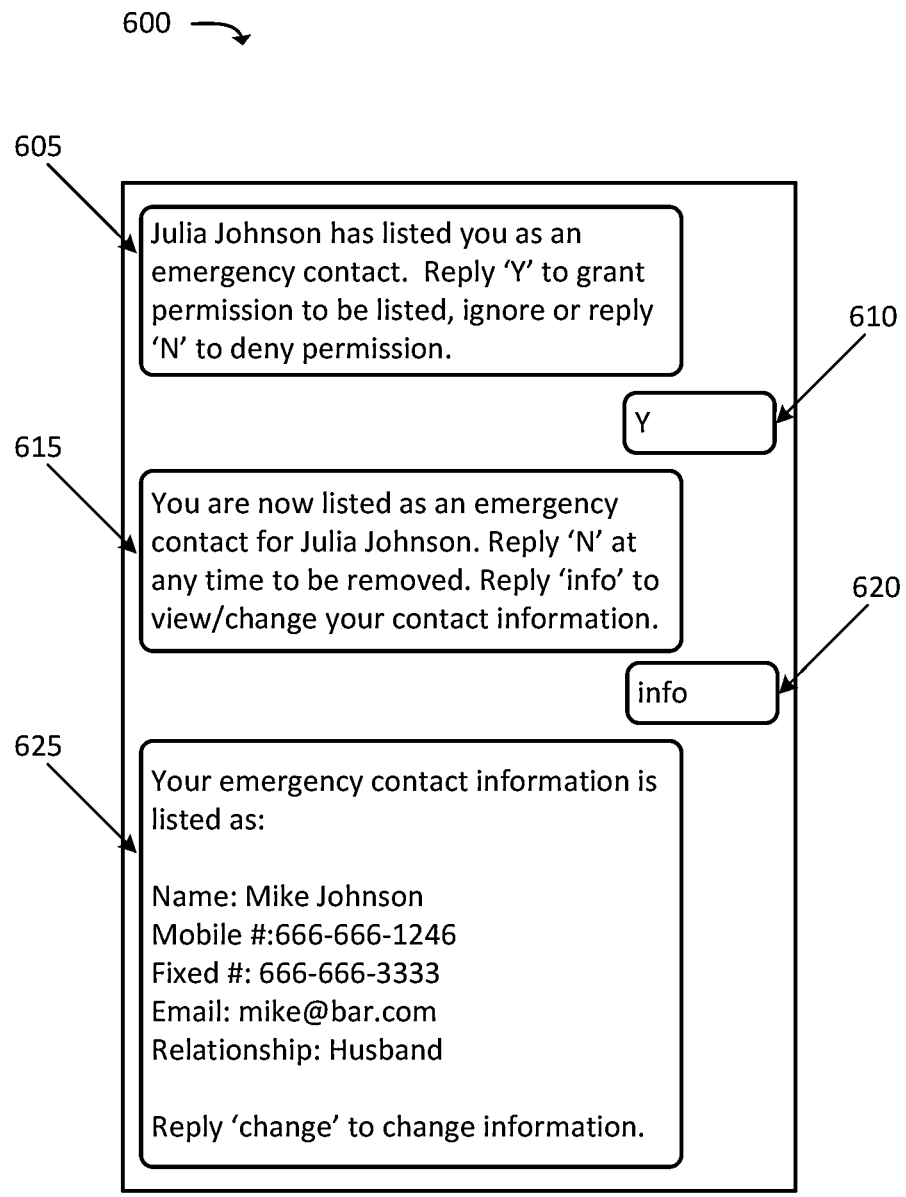
FIGS. 6 and 7 illustrate examples of obtaining consent from a user who has been listed as an emergency contact.

FIG. 6 illustrates an example user interface 600, which may be presented on a particular user device 305 that is associated with an emergency contact. User interface 600 may correspond to a set of messages (e.g., SMS messages), sent and received by contact update/consent component 415, to obtain consent from the emergency contact. Message 605 may be sent by contact update/consent component 415 in response to contact update/consent component 415 receiving a notification (e.g., from contact input component 405, contact repository 410, and/or dynamic contact generation component 430) that an emergency contact has been added. Message 605 may provide options (e.g., "Y" and "N") that indicate consent or denial of consent to associate the emergency contact with a particular user. As shown in FIG. 6, the emergency contact may respond with message 610 ("Y"), indicating consent to being listed as an emergency contact. Contact update/consent component 415 may send message 615, which may be a confirmation message indicating that the emergency contact has been listed. Message 615 may also include options, such as an option to revoke consent and an option to view and/or change the emergency contact information. As further shown, the emergency contact may reply with message 620 ("info"), indicating that the emergency contact wishes to view and/or change the information listed for the emergency contact. In response to message 620, contact update/consent component 415 may send message 625, which provides the information for the emergency contact, as well as an option to modify the information. Thus, message 625 may provide the emergency contact with an opportunity to verify that his or her information is listed properly.

Figure 7:
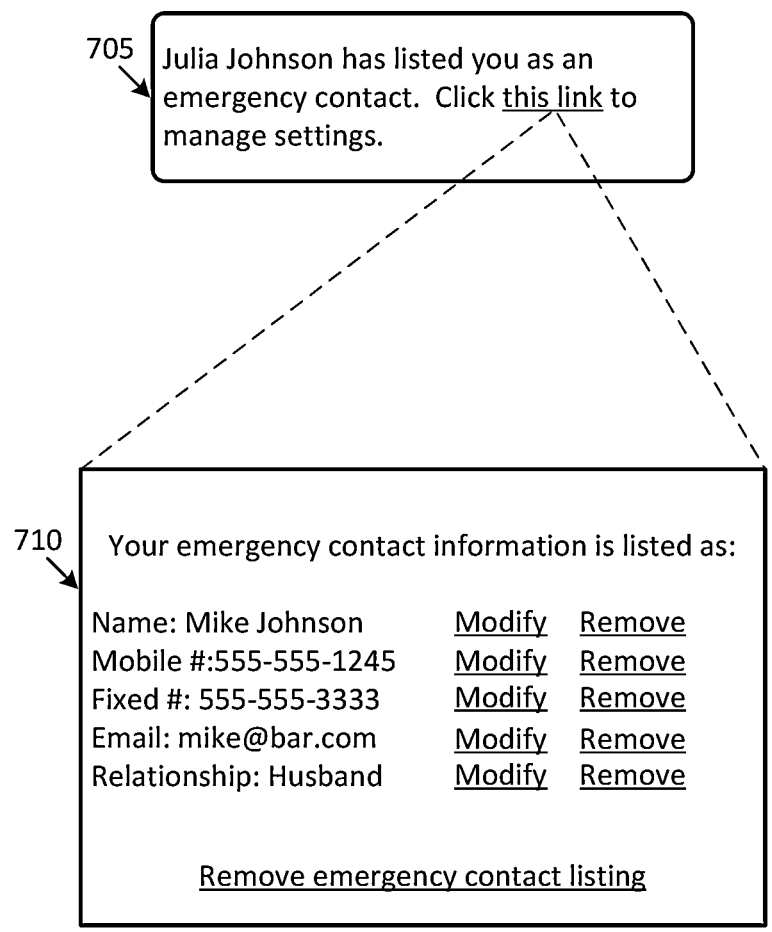

FIG. 7 illustrates another example of notifying an emergency contact when the emergency contact is added. For example, message 705 (e.g., an SMS message, an email message, or another type of message) may be sent to the emergency contact. Message 705 may include a link (e.g., web a hyperlink) to view user interface 710, which may be provided via, for example, a web page. User interface 710 may include emergency contact information, as well as options to modify the information, remove some information, or remove the emergency contact information entirely.

Returning to FIG. 4, when contact update/consent component 415 receives consent from an emergency contact, contact update/consent component 415 may notify contact repository 410 that consent has been received. Based on this notification, contact repository 410 may store emergency contact information for the contact, or may forgo removing stored emergency contact information for the contact. When contact update/consent component 415 determines that consent has not been received (e.g., a consent message has not been received, or a denial message has been received), contact update/consent component 415 may notify contact repository 410 that consent has not been received. Based on this notification, contact repository 410 may forgo storing emergency contact information for the contact, or may remove stored emergency contact information for the contact.

As mentioned above, contact update/consent component 415 may, in some implementations, periodically update emergency contact information that has been stored by contact repository 410. For example, contact update/consent component 415 may periodically (e.g., once a week, once a month, twice a year, or at any other interval) send a confirmation message (e.g., an SMS message, an email message, or another type of message) to an emergency contact. This confirmation message may, in some implementations, request affirmative consent from an emergency contact to remain listed. In other implementations, the confirmation message may indicate that the emergency contact will remain to be listed unless affirmative denial is received from the emergency contact. In some implementations, the confirmation message may present contact information (e.g., telephone numbers, etc.) associated with the emergency contact, and may provide an opportunity for the emergency contact to modify the information. For instance, if an emergency contact changes his or her phone number, this periodic update message may provide an opportunity for the emergency contact to update the information listed for the emergency contact.

In some implementations, contact update/consent component 415 may receive information from a service provider (e.g., a cellular telecommunications network provider) regarding a user, whose contact information has changed. For instance, contact update/consent component 415 may provide information to the service provider, indicating that a user associated with the service provider has been listed as an emergency contact. In some implementations, the service provider may be capable of identifying when contact information for the user has changed (e.g., the service provider may identify when the user changes telephone numbers), and may notify contact update/consent component 415 when the contact information has changed. In some implementations, contact update/consent component 415 may periodically request information from the service provider, indicating whether contact information for a particular emergency contact has changed.

Contact update/consent component 415 may, in some implementations, periodically place a telephone call to a particular telephone number associated with an emergency contact in order to verify whether the telephone number is valid. If the telephone call does not go through (e.g., if the telephone number has been disconnected), contact update/consent component 415 may identify that the telephone number is no longer valid, and may remove the telephone number from the emergency contact information, or may remove the emergency contact information entirely. If the telephone call goes through, contact update/consent component 415 may provide an automated voice message that indicates that the purpose of the call was to verify contact information for the emergency contact. In some implementations, the voice call may provide options (e.g., by pressing a key on a keypad of a telephone) for the emergency contact to modify emergency contact details, or to revoke consent to be listed as an emergency contact.

Contact lookup component 420 may receive requests to look up emergency contact information that is associated with a user. For instance, contact lookup component 420 may receive information identifying a user (e.g., a victim of a car accident), and may output emergency contact information associated with the user. Contact lookup component 420 may, in some implementations, request emergency contact information from contact repository 410 and/or from dynamic contact generation component 430. For instance, contact lookup component 420 may receive information associated with the user (e.g., a name, telephone number, address, and/or other information), and may identify whether emergency contact is stored for the user by contact repository 410, and/or whether emergency contact information for the user can be provided by dynamic contact generation component 430. For instance, referring to FIG. 5, dynamic contact generation component 430 may query contact repository 410 to determine whether information in data structure 500 matches information received for a user. For example, assume that contact lookup component 420 receives a request for emergency contact information matching the telephone number 555-555-1234. In some implementations, contact lookup component 420 may query contact repository 410 for emergency contact information based on the telephone number. Contact repository 410 may identify, based on the telephone number, that three emergency contacts are associated with the telephone number: Contact 1, Contact 2, and Contact 3. Contact repository 410 may identify the information associated with these emergency contacts (e.g., information stored in instances of data structure 505), and may provide the identified emergency contact information to contact lookup component 420.

Contact lookup component 420 may, in turn, provide the identified emergency contact information (received from contact repository 410 and/or dynamic contact generation component 430) to the user who requested the information. In some implementations, contact lookup component 420 may rank emergency contacts, and provide the emergency contact information in the form of a ranked list. For instance, contact lookup component 420 may rank the emergency contacts based on proximity of the emergency contact to a current location of the user associated with the emergency contact, relationship of the emergency contact to the user, the source from which the emergency contact information was received (e.g., from contact repository 410 or from dynamic contact generation component 430), how often the user contacts the emergency contact, and/or other factors.

Contact lookup component 420 may determine the geographic location of a particular emergency contact or a user, with which the emergency contact is associated, using one or more techniques. For example, information regarding the location of a particular user device 305 may be requested from a service provider associated with the particular user device 305. As another example, information regarding the location of a particular user device 305 may be requested from the particular user device 305 itself. In some implementations, the geographic location of a particular user may be determined based on an area code of a telephone number (e.g., a fixed telephone number) associated with the particular user.

Programming interface component 425 may provide an application programming interface ("API"), which may be used to provide a mechanism for a user to request emergency contact information. For instance, the API may allow for a software developer (e.g., a developer associated with device 400 and/or a third party developer) to generate a user interface, via which a user can request and access emergency contact information. FIG. 8 illustrates an example user interface 800, which may utilize such an API. User interface 800 may be used to enter information regarding a user for whom emergency contact information is desired (e.g., a victim of a car accident). Information regarding the user may be provided via example user interface 800, such as a telephone number, a name, an address, and a zip code. As mentioned above, in some situations, not all information regarding the user may be known. In these situations, emergency contact information may still be able to be looked up, based on at least some of the information being provided.

Figure 9:
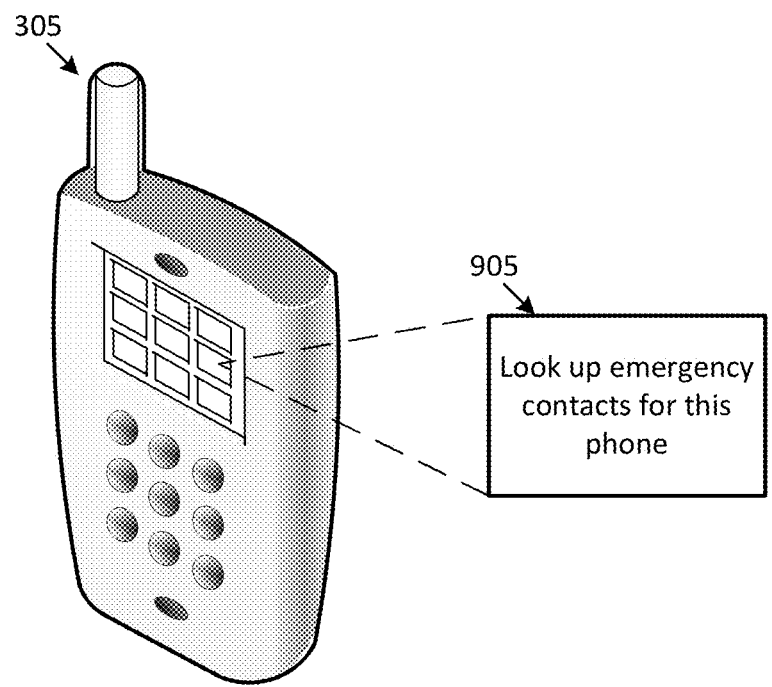

FIG. 9 illustrates another example technique via which emergency contact information may be requested (e.g., by utilizing an API provided by programming interface component 425). As shown in FIG. 9, user device 305 may provide option 905 (e.g., a selectable graphical option, such as a button or an icon), which may be used to look up emergency contacts for user device 305. When option 905 is selected, information regarding user device 305 (e.g., a telephone number associated with user device 305, a device identifier such as an International Mobile Subscriber Identity ("IMSI") number, and/or other identifying information) may be provided to contact lookup component 420.

FIG. 10 illustrates an example user interface 1000, via which emergency contact information may be provided (e.g., by utilizing an API provided by programming interface component 425). As shown in FIG. 10, user interface 1000 may display information included in the request for emergency contact information (e.g., that these contact details are being shown based on the telephone number 555-555-1234). User interface 1000 may also display additional information regarding the user, which was not included in the request (e.g., that the user's name is John Smith). User interface 1000 may additionally display one or more emergency contacts associated with the user (e.g., emergency contacts identified by contact lookup component 420). The displayed contacts may, in some implementations, be displayed in a ranked order (e.g., based on a ranking performed by contact lookup component 420).

In some implementations, user interface 1000 may only include up to a predefined maximum quantity of emergency contacts. For instance, assume that contact lookup component 420 has identified five emergency contacts associated with the user. User interface 1000 may, in some implementations, display fewer than five emergency contacts (e.g., the highest ranked three emergency contacts). As further shown in FIG. 10, user interface 1000 may include an indication (shown in the figure an asterisk) that a particular emergency contact was dynamically identified (e.g., identified by dynamic contact generation component 430, as opposed to manually provided by the user).

Returning to FIG. 4, dynamic contact generation component 430 may dynamically identify emergency contacts associated with a user. For example, dynamic contact generation component 430 may receive an indication (e.g., from contact lookup component 420) that emergency contact information was requested for a user. Dynamic contact generation component 430 may dynamically generate emergency contacts (hereinafter sometimes referred to as "dynamic emergency contacts"). These dynamic emergency contacts may be contacts that have not been manually provided by the user. Dynamic contact generation component 430 may identify dynamic emergency contacts based on one or more factors, such as proximity of the dynamic emergency contact to the user and/or an amount of communication (e.g., a frequency and/or amount of calls and/or messages) between the dynamic emergency contact and the user. Dynamic contact generation component 430 may, in some implementations, receive information regarding the amount of communication between the dynamic emergency contact and the user from a network provider associated with the dynamic emergency contact and/or the user.

Referring back to the example situation shown in FIG. 2, identifying dynamic emergency contacts may be useful when a user is in a location (e.g., location 215) that is distant from the user's manually provided emergency contacts (e.g., contacts that are located at locations 210). Dynamic contact generation component 430 may identify that the user has frequently (e.g., at least a threshold frequency, such as two times in the last month, once a week for the last four weeks, or another threshold frequency) called contacts closer to location 215 (e.g., contacts that are located at locations 220). Thus, based on the proximity of these contacts, as well as the amount of communication between these contacts and the user, dynamic contact generation component 430 may identify these contacts as dynamic emergency contacts for the user.

In some implementations, dynamic contact generation component 430 may periodically or occasionally (e.g., at a regular interval or at an irregular interval) automatically identify dynamic emergency contacts for users. That is, in some such implementations, dynamic contact generation component 430 may identify dynamic emergency contacts without a request, for emergency contact information, from contact lookup component 420. For instance, dynamic contact generation component 430 may periodically or occasionally identify dynamic emergency contact information for users, for whom emergency contact information is stored (e.g., in data structure 500). Based on identifying dynamic emergency contacts, dynamic contact generation component 430 may provide information regarding the dynamic emergency contacts to contact repository 410 and/or to contact update/consent component 415. In turn, as discussed above, contact update/consent component 415 may, in some implementations, obtain consent from these dynamic emergency contacts before the information is stored by contact repository 410.

Figure 11:
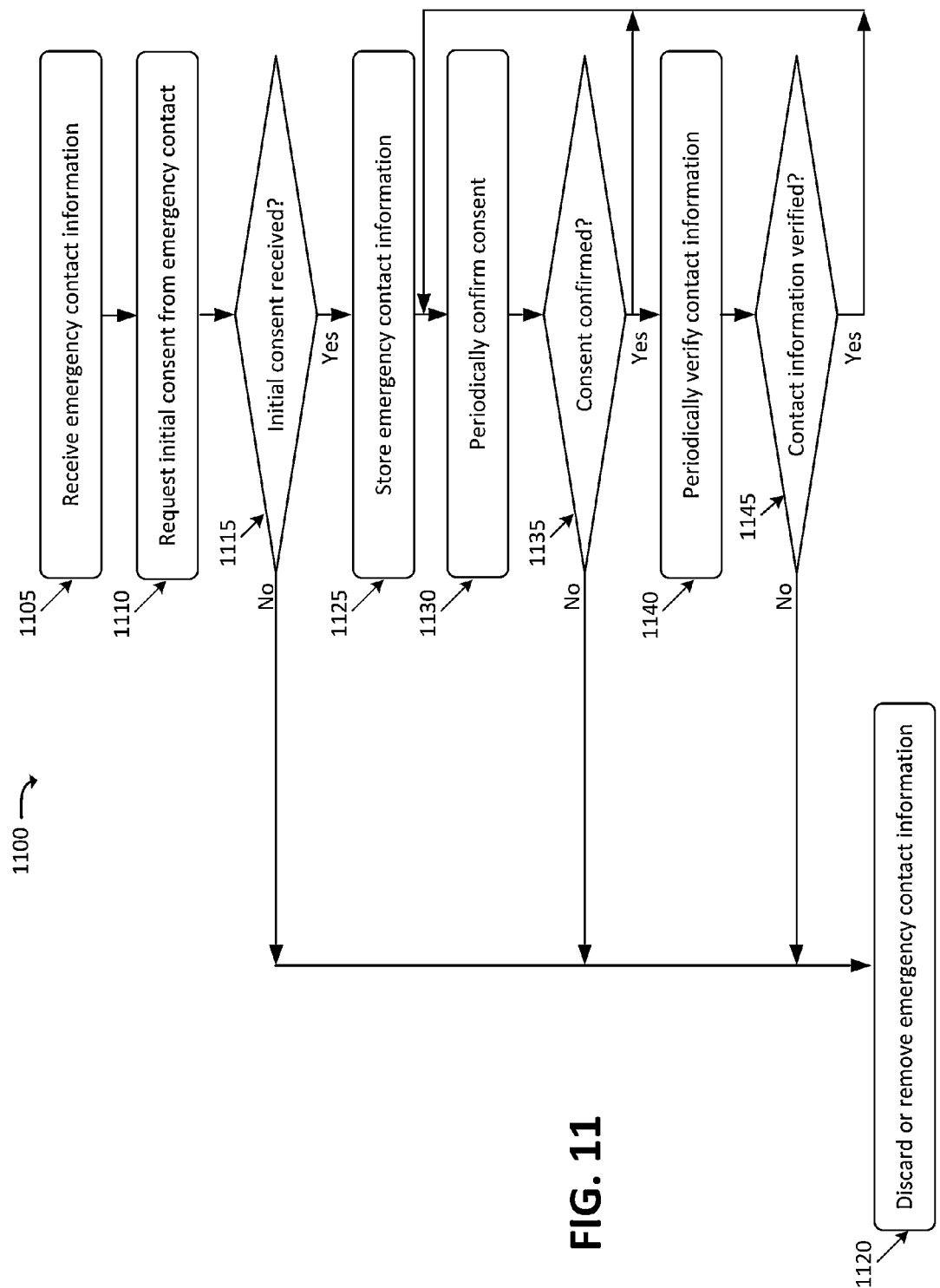
FIG. 11 illustrates a process for receiving and verifying emergency contact information.

FIG. 11 illustrates an example process 1100 for receiving and verifying emergency contact information. In one example implementation, process 1100 may be performed by one or more components of emergency contact information server 310. For instance, some or all of process 1100 may be performed by contact input component 405, contact update/consent component 415, and/or another component of emergency contact information server 310.

Process 1100 may include receiving emergency contact information (block 1105). For example, as described above with respect to contact input component 405, emergency contact information server 310 may receive emergency contact information from a user (e.g., a user who desires to manually provide emergency contact information associated with the user). The emergency contact information may include, for example, a name, a telephone number, an email address, a relationship to the user, and/or other information. When receiving the emergency contact information (at block 1105), contact input component 405 may provide the emergency contact information to contact repository 410 and/or to contact update/consent component 415.

Process 1100 may also include requesting initial consent from the emergency contact (block 1110). For example, as described above with respect to contact update/consent component 415, emergency contact information server 310 may request consent from the emergency contact, using a telephone number, an email address, and/or other information received (at block 1105). In some implementations, emergency contact information server 310 may request consent using messages similar to those shown in FIGS. 6 and 7.

If initial consent is not received (block 1115—NO), then process 1100 may include discarding or removing the emergency contact information (block 1120). For instance, as described above with respect to contact update/consent component 415, if consent is not received from the emergency contact, emergency contact information server 310 may forgo storing the emergency contact information, and/or may delete stored information corresponding to the emergency contact. In some implementations, emergency contact information server 310 may retain information regarding the emergency contact, but may store an indication that the emergency contact has not provided consent to be listed as an emergency contact for the user. If, on the other hand, initial consent is received (block 1120—YES), then process 1100 may include storing the emergency contact information (block 1125).

Process 1100 may additionally include periodically or occasionally confirming consent (block 1130). For example, as described above with respect to contact update/consent component 415, emergency contact information server 310 may periodically (e.g., once a week, once a month, etc.) or occasionally request confirmation from the emergency contact that the emergency contact would like to remain listed. If consent is not confirmed (block 1135—NO), then process 1100 may include discarding or removing the emergency contact information (block 1120).

Process 1100 may include periodically verifying the emergency contact information (block 1140). For example, as described above with respect to contact update/consent component 415, emergency contact information server 310 may periodically (e.g., once a week, once a month, etc.) verify emergency contact information by sending messages to the emergency contact, calling the emergency contact, receiving updated contact information from a service provider, or via other techniques.

If the emergency contact information is not verified (block 1145—YES), then process 1100 may include discarding or removing the emergency contact information (block 1120). For example, if a telephone number associated with the emergency contact is no longer in service, emergency contact information server 310 may discard or remove the emergency contact information. In some implementations, emergency contact information server 310 may retain the emergency contact information, but remove the telephone number that is no longer in service.

If, on the other hand, the emergency contact information is verified (block 1145—NO), then portions of process 1100 may be periodically repeated. For instance, as shown, process 1100 may return to block 1130. In some implementations, blocks 1140 may be performed more often, or on a different interval, than blocks 1130 and 1135. While these other implementations may be used, the order of blocks shown in FIG. 11 is one example of an order in which the various blocks of process 1100 may be performed.

Figure 12:
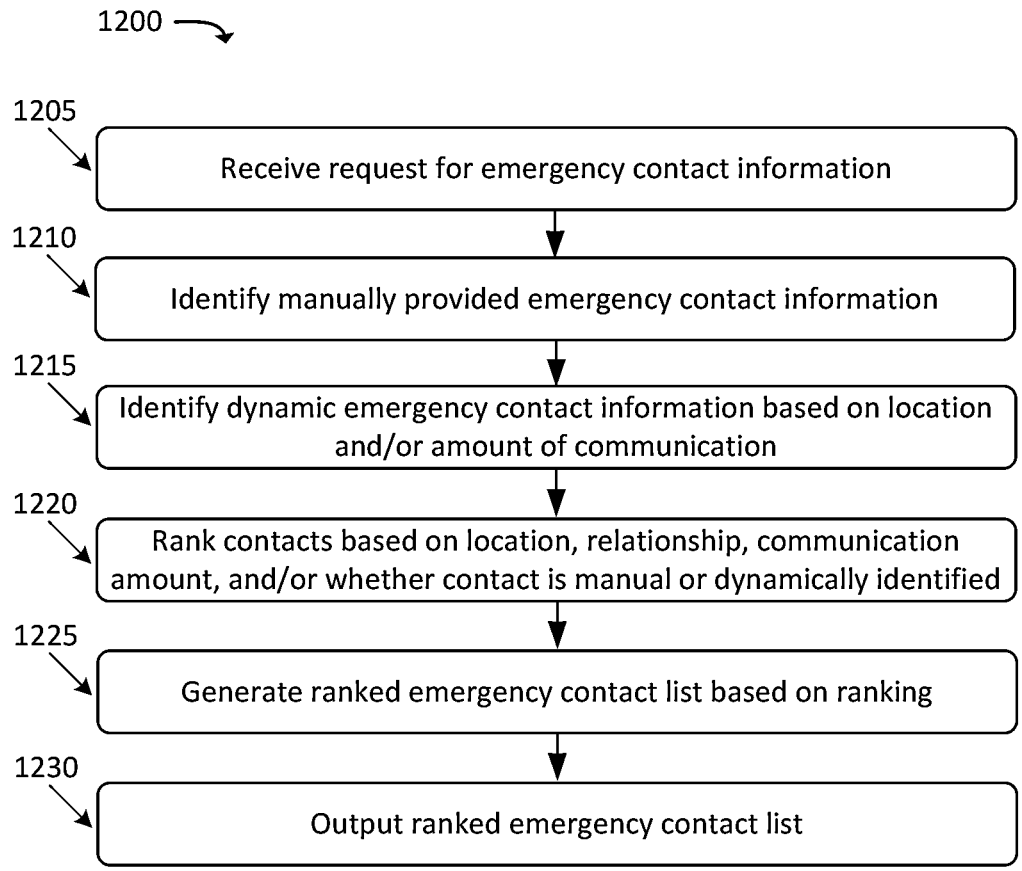
FIG. 12 illustrates a process for providing emergency contact information.

FIG. 12 illustrates an example process 1200 for providing emergency contact information in response to a request for emergency contact information. In one example implementation, process 1200 may be performed by one or more components of emergency contact information server 310. For instance, some or all of process 1200 may be performed by contact lookup component 420, programming interface component 425, dynamic contact generation component 430, and/or another component of emergency contact information server 310.

Process 1200 may include receiving a request for emergency contact information (block 1205). For example, as described above with respect to contact lookup component 420, emergency contact information server 310 may receive a request with identifying information (e.g., name, telephone number, address, and/or other information) regarding a user. In some implementations, the information may be provided via a user interface, such as user interface 800, shown in FIG. 800. In some implementations, the information may be provided via a selection of an option on user device 305, that is associated with the user (e.g., as shown in FIG. 9). As also mentioned above, the request may be made via programming interface component 425, in some implementations.

Process 1200 may also include identifying manually provided emergency contact information (block 1210). For example, as described above with respect to contact lookup component 420, emergency contact information server 310 may receive emergency contact information from contact repository 410 that is associated with the user. This emergency contact information may, in some implementations, correspond to emergency contact information that was manually provided by the user.

Process 1200 may further include identifying dynamic emergency contact information based on location and/or amount of communication (block 1215). For example, as described above with respect to dynamic contact generation component 430, emergency contact information server 310 may identify dynamic contact information based on a location of the user and locations of contacts that are frequently communicated with by the user. As mentioned above (e.g., with respect to FIG. 2), dynamic emergency contact information may be advantageous in situations where a user is outside of a user's normal geographical location.

Process 1200 may additionally include ranking the emergency contacts based on location, relationship, communication amount, and/or whether the emergency contact is a manually provided emergency contact or a dynamic emergency contact (block 1220). For example, as described above, contact lookup component 420 may rank the emergency contacts received, for which information was received from contact repository 410 and/or dynamic contact generation component 430.

Process 1200 may also include generating a ranked emergency contact list based on the ranking (block 1225), and outputting the ranked emergency contact list (block 1230). For example, emergency contact information server 310 may output the ranked emergency contact list to a requestor of the emergency contact information.

Figure 13:
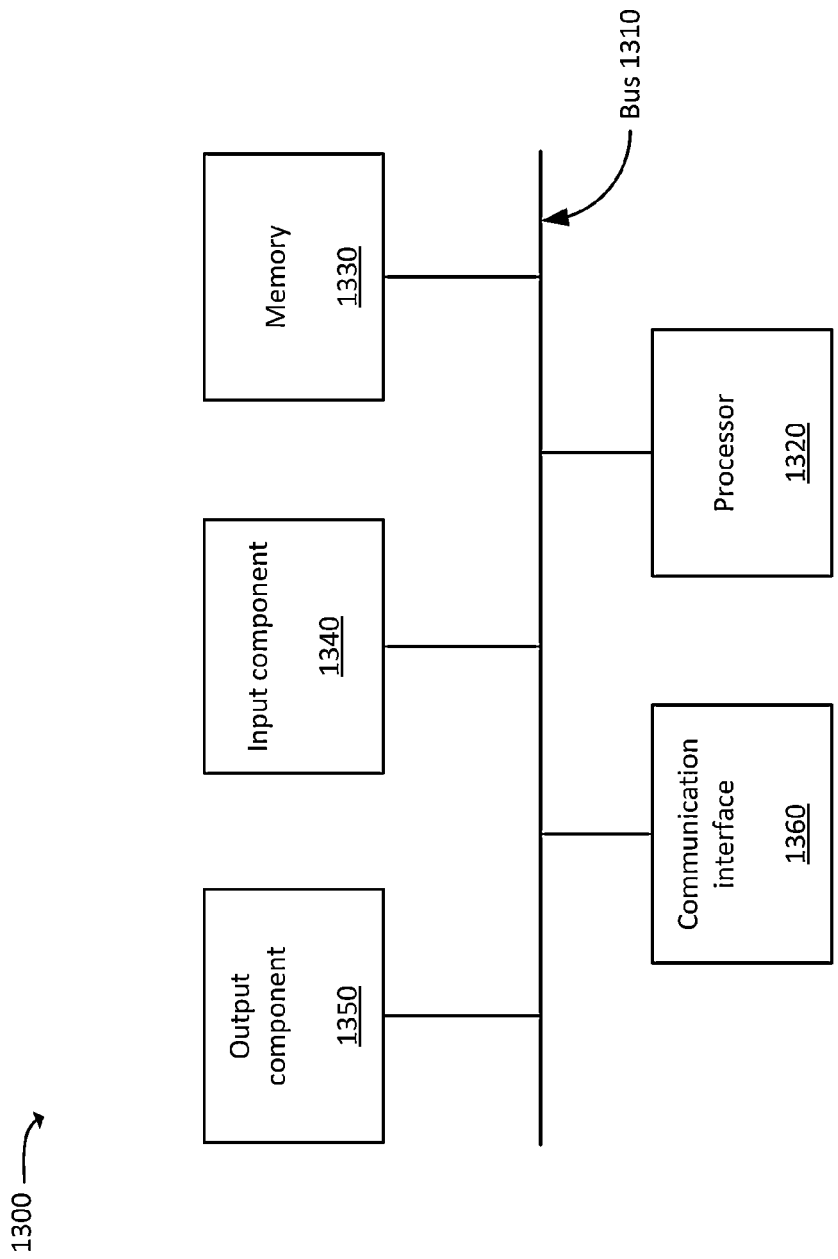
FIG. 13 illustrates example components of one or more devices of one or more implementations described herein.

FIG. 13 is a diagram of example components of device 1300. One or more of the devices illustrated in FIGS. 1, 3, 4, and 9 may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, a microphone, a touch screen, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, a cellular radio, or the like. Communication interface 1360 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIGS. 11 and 12, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
receiving, by one or more server devices and from a device associated with a first user, an indication that contact information for a third user should be stored as emergency contact information for the first user, the indication being based on a manual indication provided by the first user, via the device associated with the first user;

notifying, by the one or more server devices, the third user that the first user has indicated that the contact information for the third user should be stored as emergency contact information for the first user, the notifying including:
    outputting, to a device associated with the third user, the contact information for the third user, received from the device associated with the first user,
    providing, to the device associated with the third user, a selectable option to modify the contact information for the third user,
    receiving, from the device associated with the third user and based on a selection of the selectable option, modified contact information for the third user, and
    storing the modified contact information as the contact information for the third user;
receiving, by the one or more server devices and from a particular user device, a request for emergency contact information associated with the first user, the request including information identifying the first user;
determining, by the one or more server devices, a geographic location of the device associated with the first user, the determining including:
    receiving, from a wireless service provider associated with the device of the first user, the geographic location of the device of the first user;
dynamically identifying, by the one or more server devices, a second user, the identifying being based on:
    an amount or frequency of communication between the first user and the second user, and
    a geographical proximity of the device associated with the first user to a device associated with the second user;
identifying, by the one or more server devices, contact information associated with the second user;
ranking, by the one or more server devices, the second user and the third user with respect to each other, wherein the ranking is based at least on the third user having been manually identified by the first user and the second user having been dynamically identified; and
outputting, by the one or more server devices and to the particular user device from which the request was received, the contact information associated with the second user and the third user, the contact information being presented as part of a ranked list, that is based on the ranking.

2. The method of claim 1, wherein the information identifying the first user includes at least one of:
    a telephone number associated with the first user,
    a name of the first user, or
    an address of the first user.

3. The method of claim 1, wherein the request is received from the device associated with the first user, wherein the information identifying the first user includes a device identifier associated with the device associated with the first user.

4. The method of claim 1, wherein determining the geographic location of the device associated with the first user includes at least one of:
    receiving, from the device of the first user, information regarding the geographic location of the device of the first user.

5. The method of claim 1, further comprising:
    determining whether the second user has provided consent to be listed as an emergency contact for the first user, wherein the outputting is performed based on determining that the second user has provided consent to be listed as an emergency contact for the first user.

6. The method of claim 1, wherein the ranking is based on:
    at least one of:
        a proximity of the device associated with the second user to the device associated with the first user, or
        a proximity of the device associated with the third user to the device associated with the first user, and
    at least one of:
        the amount or frequency of communication between the second user and the first user,
        an amount or frequency of communication between the third user and the first user,
        a relationship of the second user to the first user, or
        a relationship of the third user to the first user.

7. A system, comprising:
one or more memory devices configured to store a set of processor-executable instructions; and
one or more processors configured to execute the set of processor-executable instructions, to:
    receive, from a device associated with a first user, an indication that contact information for a third user should be stored as emergency contact information for the first user;
    notify the third user that the first user has indicated that the contact information for the third user should be stored as emergency contact information for the first user, the notifying including:
        outputting, to a device associated with the third user, the contact information for the third user, received from the device associated with the first user,
        providing, to the device associated with the third user, a selectable option to modify the contact information for the third user,
        receiving, from the device associated with the third user and based on a selection of the selectable option, modified contact information for the third user, and
        storing the modified contact information as the contact information for the third user;
    receive, from a particular device, a request for emergency contact information associated with the first user, the request including information identifying the first user;
    identify a second user, the identifying being based on an amount or frequency of communication between the first user and the second user;
    identify contact information associated with the second user and the third user;
    receive, from a wireless service provider associated with the device of the first user, information indicating a location of the device of the first user;
    rank the second and third users, with respect to each other, based on:
        a geographical distance between the location of the device of the first user and a location of a device of the second user, and
        a geographical distance between the location of the device of the first user and a location of the device of the third user; and
    output, to the particular device from which the request was received, a ranked list, based on the ranking of the second and third users, the contact information associated with the second user and the third user, the contact information being presented, in the ranked list, according to the respective ranking of the second and third users.

8. The system of claim 7, wherein the information identifying the first user includes at least one of:
a telephone number associated with the first user,
a name of the first user, or
an address of the first user.

9. The system of claim 7, wherein the request is received from the device associated with the first user, wherein the information identifying the first user includes a device identifier associated with the device associated with the first user.

10. The system of claim 7, wherein the one or more processors are further configured to:
determine whether the second user has provided consent to be listed as an emergency contact for the first user, wherein the outputting is performed based on determining that the second user has provided consent to be listed as an emergency contact for the first user.

11. The system of claim 7, wherein the ranking is further based on at least one of:
the amount or frequency of communication between the second user and the first user,
an amount or frequency of communication between the third user and the first user,
a relationship of the second user to the first user, or
a relationship of the third user to the first user.

12. A non-transitory computer-readable medium, comprising:
a plurality of computer-executable instructions, which, when executed by one or more processors of one or more devices, cause the one or more processors to:
identify a first user for whom emergency contact information is stored;
identify, based on a communication history of the first user, a second user that has been in communication with the first user;
determine a frequency of communication between the first user and the second user;
determine that the frequency of communication, between the first user and the second user, exceeds a threshold frequency;
request, from a device associated with the second user and based on determining that the frequency of communication, between the first user and the second user, exceeds the threshold frequency, consent to be listed as an emergency contact for the first user;
receive, from the device associated with the second user and based on the request for consent, consent to be listed as an emergency contact for the first user;
provide, to the device associated with the second user, contact information that has been indicated as being associated with the second user;
provide, to the device associated with the second user, a selectable option to modify the contact information for the third user,
receive, from the device associated with the second user and based on a selection of the selectable option, modified contact information for the second user, and
store, based on receiving the consent and based on receiving the modified contact information, the modified contact information associated with the second user;

receive, from a particular device, a request for emergency contact information associated with the first user;
determine, based on receiving the request for emergency contact information, that the frequency of communication, between the first user and the second user, is higher than a frequency of communication, between the first user and a third user who has been manually identified by the first user as an emergency contact for the first user,
wherein the second user is selected as the emergency contact in lieu of the third user, based on the determination that the frequency of communication, between the first user and the second user, is higher than the frequency of communication, between the first user and the third user who was manually identified by the first user; and
output, to the particular device from which the request was received, the modified contact information associated with the second user, in lieu of the third user.

13. The non-transitory computer-readable medium of claim 12, wherein the plurality of computer-executable instructions further cause the one or more processors to:
determine, based on the receiving the request for emergency contact information, that the second user is within a particular distance of the first user,
wherein the outputting is performed based on determining that the second user is within a particular distance of the first user.

14. The non-transitory computer-readable medium of claim 12, wherein the plurality of computer-executable instructions further cause the one or more processors to:
determine, based on receiving the request for emergency contact information, that a geographical proximity, between the first user and the second user, is closer than a geographical proximity, between the first user and the third user,
wherein the second user is selected as the emergency contact in lieu of the third user, further based on the determination that the geographical proximity, between the first user and the second user, is closer than the geographical proximity, between the first user and the third user.

15. The non-transitory computer-readable medium of claim 12, wherein the contact information, associated with the second user, includes a telephone number associated with the second user.

16. The non-transitory computer-readable medium of claim 12, wherein the plurality of computer-executable instructions further cause the one or more processors to:
determine whether the second user has provided consent to be listed as an emergency contact for the first user, wherein the outputting is performed based on determining that the second user has provided consent to be listed as an emergency contact for the first user.

17. The non-transitory computer-readable medium of claim 12, wherein the plurality of computer-executable instructions further cause the one or more processors to:
determine a relationship between the first user and the second user; and
determine a relationship between the first user and the third user;
wherein the second user is selected as the emergency contact in lieu of the third user further based on a determination that the relationship between the first user and the second user is a closer relationship than the relationship between the first user and the third user.

18. The non-transitory computer-readable medium of claim 12, wherein the plurality of computer-executable instructions further cause the one or more processors to:
- rank, based on a plurality of factors, the second user and the third user; and
- determine that the second user is ranked higher than the third user,
  - wherein the second user is selected as the emergency contact in lieu of the third user, further based on the determination that the second user is ranked higher than the third user.

19. The method of claim 1, wherein the selectable option is a hyperlink to a web page that includes a user interface that includes options to modify the contact information for the third user.

20. A method, comprising:
- receiving, by one or more server devices and from a device associated with the first user, an indication that contact information for a third user should be stored as emergency contact information for the first user;
- notifying, by the one or more server devices, the third user that the first user has indicated that the contact information for the third user should be stored as emergency contact information for the first user, the notifying including:
  - outputting, to a device associated with the third user, the contact information for the third user, received from the device associated with the first user,
  - providing, to the device associated with the third user, a selectable option to modify the contact information for the third user,
  - receiving, from the device associated with the third user and based on a selection of the selectable option, modified contact information for the third user, and
  - storing the modified contact information as the contact information for the third user;
- receiving, by the one or more server devices and from a particular user device, a request for emergency contact information associated with the first user, the request including information identifying the first user;
- determining, by the one or more server devices, a geographic location of the device associated with the first user, the determining including:
  - receiving, from a wireless service provider associated with the device of the first user, the geographic location of the device of the first user;
- dynamically identifying, by the one or more server devices, a second user, the identifying being based on:
  - an amount or frequency of communication between the first user and the second user, and
  - a geographical proximity of the device associated with the first user to a device associated with the second user;
- identifying, by the one or more server devices, contact information associated with the second user;
- ranking, by the one or more server devices, the second user and the third user with respect to each other, wherein the ranking is based on:
- at least one of:
  - a proximity of the device associated with the second user to the device associated with the first user, or
  - a proximity of the device associated with the third user to the device associated with the first user, and
- at least one of:
  - the amount or frequency of communication between the second user and the first user,
  - an amount or frequency of communication between the third user and the first user,
  - a relationship of the second user to the first user, or
  - a relationship of the third user to the first user; and
- outputting, by the one or more server devices and to the particular user device from which the request was received, the contact information associated with the second user and the third user, the contact information being presented as part of a ranked list, that is based on the ranking.

* * * * *